United States Patent [19]
Lucht et al.

[11] Patent Number: 5,881,835
[45] Date of Patent: Mar. 16, 1999

[54] AXLE COVER AND MOTORCYCLE HAVING THE SAME

[75] Inventors: Doreen Lucht, Franklin; William G. Davidson, Delafield, both of Wis.

[73] Assignee: Harley-Davidson Motor Company, Milwaukee, Wis.

[21] Appl. No.: 690,163

[22] Filed: Jul. 26, 1996

[51] Int. Cl.⁶ .................................................. B62D 25/16
[52] U.S. Cl. ...................... 180/219; 280/279; 280/152.1; 280/157; 293/105; 301/37.38; D12/126
[58] Field of Search .............................. 280/152.1, 152.2, 280/152.3, 160.1, 157, 304.3, 288.4, 279; 301/37.38, 37.41, 108.5; 180/219; D12/126, 127; 293/105; 74/608, 609

[56] References Cited

U.S. PATENT DOCUMENTS

| | | | |
|---|---|---|---|
| D. 339,554 | 9/1993 | Davidson | D12/126 |
| 1,618,919 | 2/1927 | Dauteuil . | |
| 1,662,545 | 3/1928 | Spelta . | |
| 2,006,617 | 7/1935 | Anderson | 280/152.1 |
| 3,034,833 | 5/1962 | Ares | 301/37.41 |
| 3,924,898 | 12/1975 | Kain | 301/108.5 |
| 4,744,606 | 5/1988 | Yoshida | 296/198 |
| 4,967,867 | 11/1990 | Fuller | 180/219 |

*Primary Examiner*—Anne Marie Boehler
*Attorney, Agent, or Firm*—Michael, Best & Friedrich LLP

[57] ABSTRACT

A motorcycle including a fork assembly, a wheel including a wheel axle connected to the fork assembly, a bushing rotatably mounted on the wheel axle (e.g., by a spherical bearing), and an axle cover mounted on the bushing. The axle cover includes a base portion having a periphery, and a skirt portion extending away from at least a part of the periphery of the base portion. The skirt portion preferably defines at least one gap adapted to receive a fender strap to thereby allow the fender strap to be recessed into the axle cover. The axle cover can also include an opening through which the bushing is positioned. In addition, a hub cap can be connected to the bushing such that the axle cover is compressed between the hub cap and the bushing.

14 Claims, 4 Drawing Sheets

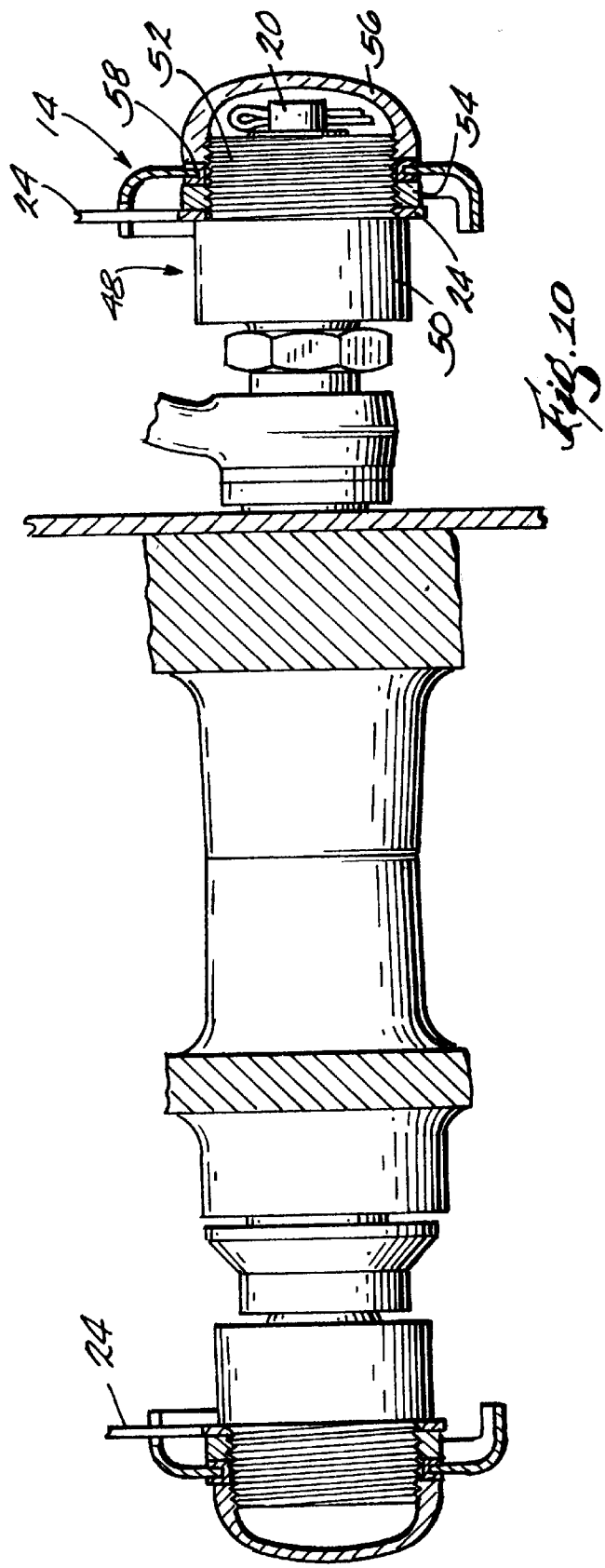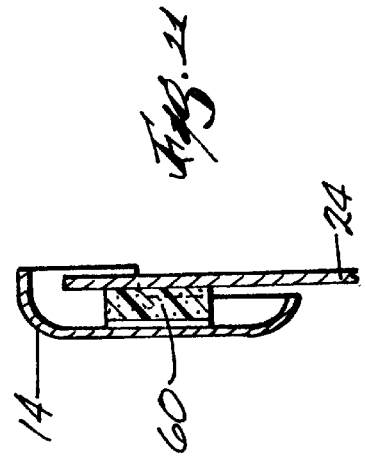

AXLE COVER AND MOTORCYCLE HAVING THE SAME

FIELD OF THE INVENTION

The present invention generally relates to the field of motorcycle wheel axle covers.

BACKGROUND OF THE INVENTION

Axle covers have been used on motorcycles as an aesthetic accessory that covers a portion of the axle, and can be used to cover the rocker of a rocker-type suspension.

SUMMARY OF THE INVENTION

The present invention provides a motorcycle wheel axle cover that is adapted to be mounted on a motorcycle having a wheel axle and at least one fender strap supporting a fender. The axle cover includes a base portion having a periphery, and a skirt portion extending away from at least a part of the periphery of the base portion. The skirt portion defines at least one gap (e.g., two gaps) adapted to receive the fender strap to thereby allow the fender strap to be recessed into the axle cover.

The skirt is preferably defined by a first skirt portion extending from the base portion a first distance and a second skirt portion extending from the base portion a second distance less than the first distance. In this regard, the second skirt portion at least partially defines the gap. The base portion of the axle cover can include an opening through which a portion of the wheel axle can be inserted. In addition, a resilient member (e.g., having a U-shaped cross section) can be positioned around the opening. In one embodiment, the axle cover is generally teardrop shaped.

The present invention also provides a motorcycle including a fork assembly, a wheel including a wheel axle connected to the fork assembly, a bushing rotatably mounted on the wheel axle (e.g., by a spherical bearing), and an axle cover mounted on the bushing. In one embodiment, the axle cover includes a base portion having a periphery, and a skirt portion extending away from at least a part of the periphery of the base portion. The skirt portion preferably defines at least one gap (e.g., two gaps) adapted to receive a fender strap to thereby allow the fender strap to be recessed into the axle cover. The axle cover can also include an opening through which the bushing is positioned. In addition, a hub cap can be connected to the bushing such that the axle cover is compressed between the hub cap and the bushing. The motorcycle can further include an adhesive member (e.g., foam tape) interconnecting the axle cover with a fender strap.

BRIEF DESCRIPTION OF THE DRAWINGS

FIG. 10 is a section view taken along line 10—10 in FIG. 1.

FIG. 11 is a section view taken along line 11—11 in FIG. 1.

DETAILED DESCRIPTION

Figure 1:
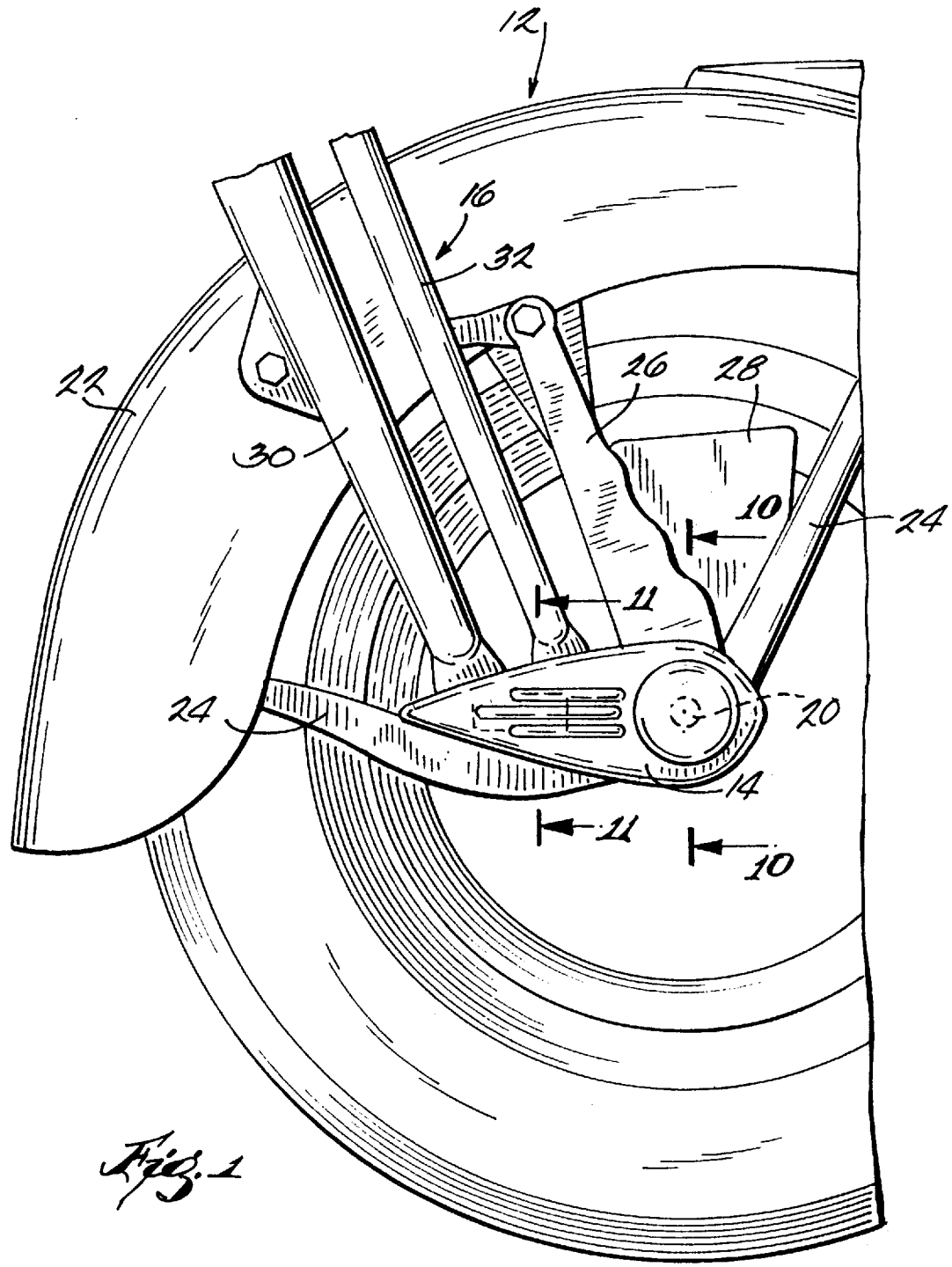
FIG. 1 is a side view of a motorcycle wheel axle cover embodying the present invention mounted to the front wheel of a motorcycle.
Figure 3:
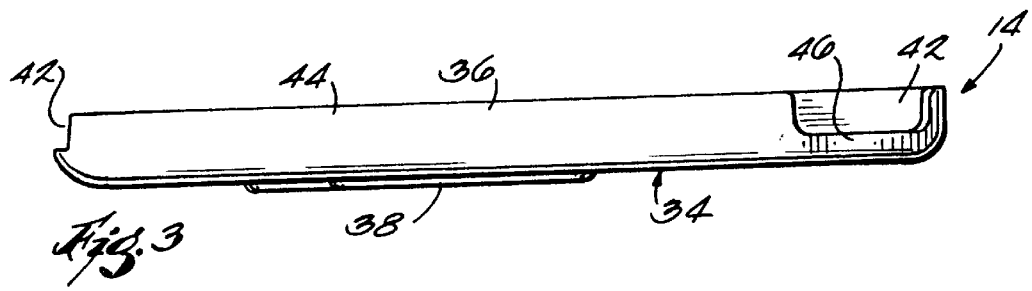
FIG. 3 is a top view of the axle cover shown in FIG. 1.
Figure 2:
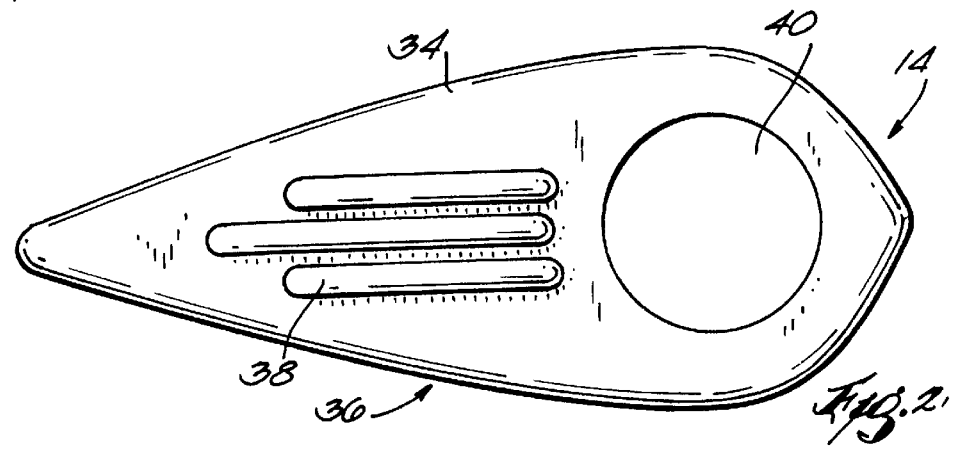
FIG. 2 is an enlarged side view of the axle cover shown in FIG. 1.
Figure 4:
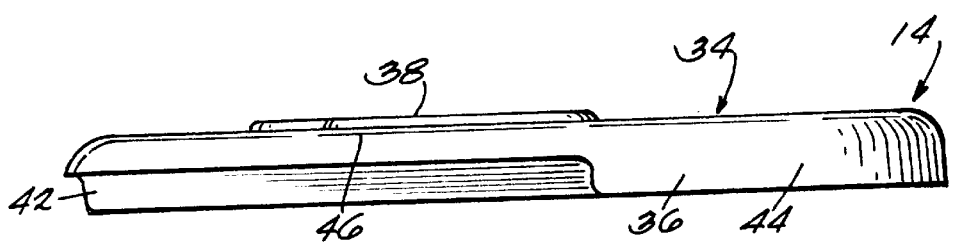
FIG. 4 is a bottom view of the axle cover shown in FIG. 1.
Figure 5:
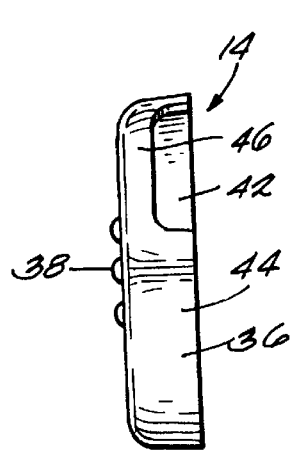
FIG. 5 is a front view of the axle cover shown in FIG. 1.
Figure 6:
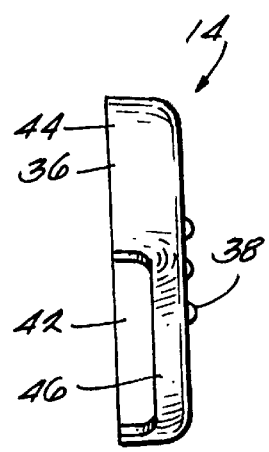
FIG. 6 is a rear view of the axle cover shown in FIG. 1.

FIG. 1 illustrates the front end of a motorcycle 12 having an axle cover 14 embodying the present invention. Briefly, the motorcycle 12 includes a front fork assembly 16, a front wheel 18 having a front axle 20 connected to the front fork assembly 16, and a fender 22 interconnected with the front wheel 18 via fender straps 24. A brake caliper arm 26 is connected to the front axle 20 and provides support to a brake caliper 28. The illustrated front fork assembly 16 is a rocker suspension including a rigid fork 30, a sprung fork 32, and rockers (not shown) connecting the lower end of the rigid fork 30 to the lower end of the sprung fork 32. The drawings only illustrate the right side of the motorcycle 12, and the left side is substantially the same with respect to the rigid fork 30, the sprung fork 32 and the rockers. In this regard, only the right side of the motorcycle 12 will be describe herein, it being understood that the left side is substantially the same, unless otherwise noted. More specific details regarding the rocker suspension can be found in U.S. Pat. No. 4,775,163, which is incorporated herein by reference in its entirety.

Referring to FIGS. 2–6, the illustrated axle cover 14 is substantially teardrop shaped to provide low wind resistance and to enhance its ornamentality. The axle cover 14 includes a base portion 34 and a skirt portion 36 extending from the base portion 34. The base portion 34 includes three ornamental ribs 38 that protrude from the base portion 34. An opening 40 in the base portion 34 is designed to allow a portion of the front axle 20 to extend through the axle cover 14 (FIG. 10), as is discussed below in more detail.

Figure 7:
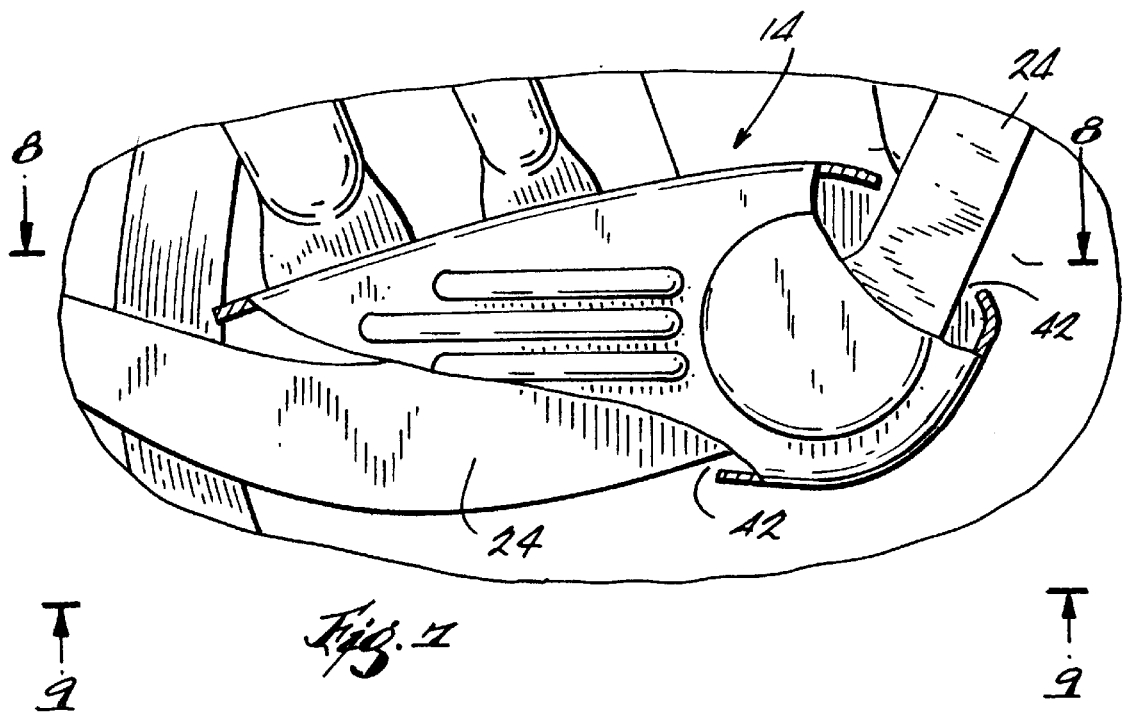
FIG. 7 is an enlarged partial section view of the axle cover shown in FIG. 1.
Figure 8:
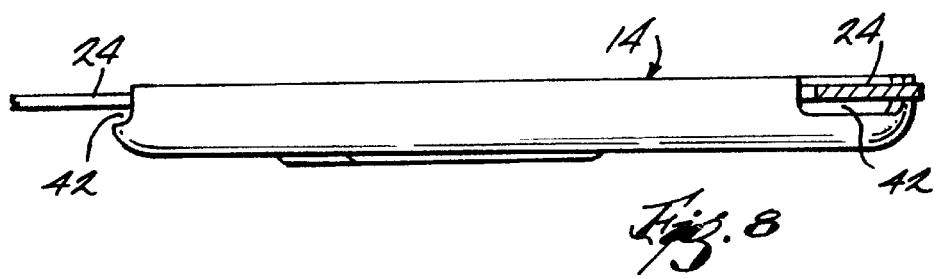
FIG. 8 is a section view taken along line 8—8 in FIG. 7.
Figure 9:
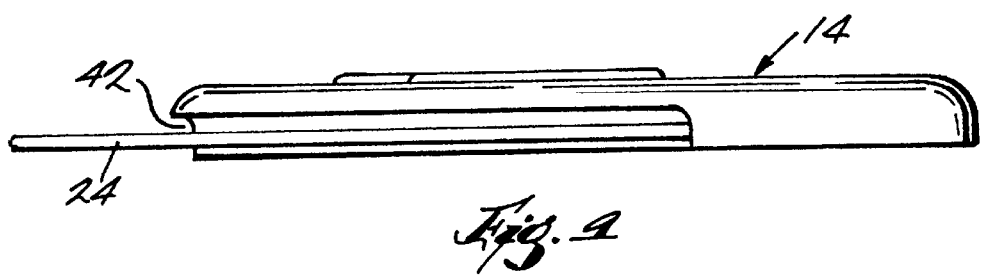
FIG. 9 is a view taken along line 9—9 of FIG. 7.

The illustrated skirt portion 36 defines two gaps 42 that are dimensioned to receive the fender straps 24. The skirt portion 36 includes two first portions 44 extending from the base portion 34 a first distance and two second portions 46 extending from the base portion 34 a second distance less than the first distance. The second portions 46 at least partially defining the gaps 42. Referring to FIGS. 7–9, the gaps 42 are designed to accommodate the fender straps 24 to thereby allow the fender straps 24 to be recessed into the axle cover 14.

Referring to FIG. 10, the axle cover 14 is designed to be connected to the front axle 20. In the illustrated embodiment, the axle cover 14 is mounted on a bushing 48. The illustrated bushing 48 includes a cylindrical base portion 50 that is rotatably mounted on the front axle 20 by a spherical bearing (not shown). A threaded portion 52 of the bushing 48 is cantilevered off of the base portion 50. The threaded portion 52 extends through a hole in the fender straps 24. A threaded collar 54 is threaded onto the threaded portion 52 and locked in place using an adhesive locking compound (not shown) to secure the fender straps 24 to the bushing 48. In this manner, movement of the front axle 20 will result in movement of the fender straps 24 and associated fender 22.

The remaining part of the threaded portion extends through the opening in the axle cover 14. The axle cover 14 is secured to the bushing 48 by an end cap 56 having internal threads that are dimensioned to thread into the threaded portion 52 of the bushing 48. Because of its large size, the end cap 56 can be tightened and loosened by hand. A resilient member 58 is positioned between the end cap 56 and the bushing 48 to provide a seal therebetween and to inhibit loosening of the end cap 56. In the illustrated embodiment, the resilient member 58 has a substantially U-shaped cross section (FIG. 10) that is adapted to sandwich the axle cover 14. In order to secure the position of the axle cover 14 relative to the fender straps 24, an adhesive member in the form of foam tape 60 is positioned between the axle cover 14 and one of the fender straps 24.

In operation, the illustrated fender assembly 22 will follow the motion of the brake caliper arm 26 when the front wheel 18 is absorbing a shock. More specifically, when the front wheel 18 is forced upward relative to the rigid fork 30, the front axle 20 will move upward the same amount. Upward movement is transferred from the front axle 20 to the fender straps 24 and to the brake caliper arm 26 due to the direct connection therebetween. The fender 22 follows the motion of the fender straps 24 and the brake caliper arm 26 due to the connection therebetween. The axle cover 14 will likewise follow the motion of the fender straps 24.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle axle cover adapted to be mounted on a motorcycle having a wheel axle and at least one fender strap supporting a fender, the axle cover comprising:
   a base portion having a periphery and defining an opening through which a portion of the wheel axle can be inserted;
   a resilient member positioned around said opening; and
   a skirt portion extending away from at least a part of said periphery of said base portion, said skirt portion defining at least one gap adapted to receive the fender strap to thereby allow the fender strap to be recessed into said axle cover.

2. A motorcycle axle cover as claimed in claim 1, wherein said skirt portion defines at least two gaps, each adapted to receive a fender strap to thereby allow the fender straps to be recessed into said axle cover.

3. A motorcycle axle cover as claimed in claim 1, wherein said skirt portion is defined by a first skirt portion extending from said base portion a first distance and a second skirt portion extending from said base portion a second distance less than the first distance, said second skirt portion at least partially defining said gap.

4. A motorcycle axle cover as claimed in claim 1, wherein said axle cover is generally teardrop shaped.

5. A motorcycle comprising:
   a fork assembly;
   a wheel including a wheel axle connected to said fork assembly;
   a bushing rotatably mounted on said wheel axle; and
   an axle cover mounted on said bushing and including an opening, said bushing being positioned through said opening in said axle cover; and
   a hub cap connected to said bushing, whereby said axle cover is compressed between said hub cap and said bushing.

6. A motorcycle as claimed in claim 5, wherein said axle cover includes:
   a base portion having a periphery; and
   a skirt portion extending away from at least a part of said periphery of said base portion.

7. A motorcycle as claimed in claim 6, further comprising a fender strap mounted on said bushing, wherein said skirt portion defines at least one gap adapted to receive said fender strap to thereby allow said fender strap to be recessed into said axle cover.

8. A motorcycle as claimed in claim 5, wherein said bushing is mounted on said front axle by a spherical bearing.

9. A motorcycle comprising:
   a fork assembly;
   a wheel including a wheel axle connected to said fork assembly;
   an axle cover having an opening, wherein at least a portion of said wheel axle is positioned through said opening; and
   a resilient member positioned around said opening.

10. A motorcycle as claimed in claim 9, wherein said resilient member has a substantially U-shaped cross-section.

11. A motorcycle as claimed in claim 9, further comprising:
    a fender strap supporting a fender; and
    an adhesive member interconnecting said axle cover with said fender strap.

12. A motorcycle as claimed in claim 11, wherein said adhesive member comprises foam tape.

13. A motorcycle as claimed in claim 9, wherein said axle cover is substantially teardrop shaped.

14. A motorcycle comprising:
    a front axle;
    a front wheel mounted for rotation about said front axle;
    a front fender disposed generally above said front wheel;
    a fender strap supporting said front fender and connecting the front fender to said front axle; and
    an axle cover interconnected with the front axle and including:
      a base portion having a periphery; and
      a skirt portion extending away from at least a part of said periphery of said base portion, said skirt portion defining at least one gap receiving said fender strap to thereby allow said fender strap to be recessed into said axle cover.

* * * * *